Aug. 18, 1931. E. H. BLUNT Re. 18,157
LOCOMOTIVE FEED WATER HEATER AND PUMP
Original Filed March 1, 1921 3 Sheets-Sheet 1
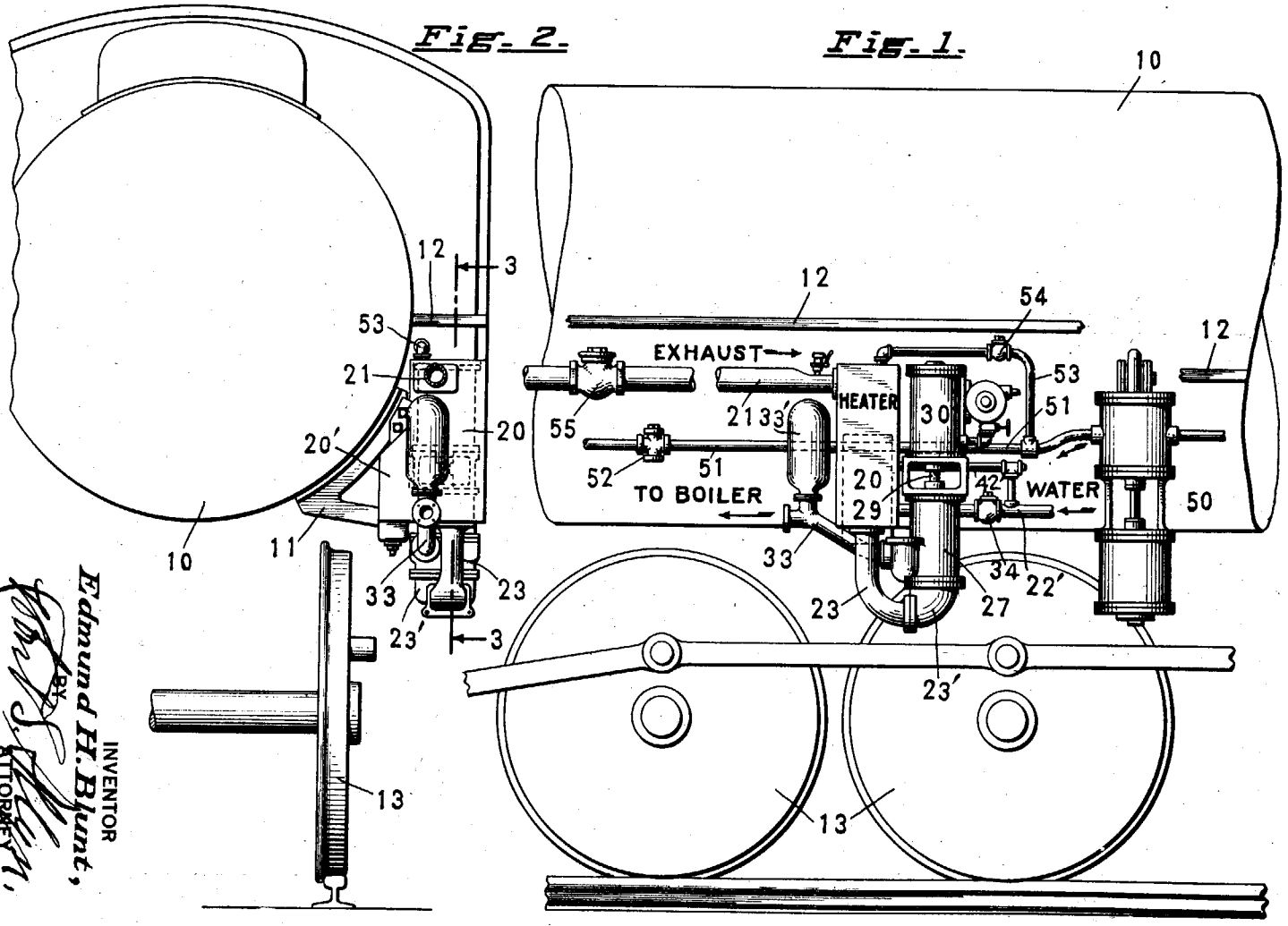
INVENTOR
Edmund H. Blunt,
BY
Robert S. Allen,
ATTORNEY Aug. 18, 1931. E. H. BLUNT Re. 18,157

LOCOMOTIVE FEED WATER HEATER AND PUMP

Original Filed March 1, 1921 3 Sheets-Sheet 2

INVENTOR
Edmund H. Blunt,
BY
ATTORNEY

Aug. 18, 1931. E. H. BLUNT Re. 18,157

LOCOMOTIVE FEED WATER HEATER AND PUMP

Original Filed March 1, 1921 3 Sheets-Sheet 3

INVENTOR
Edmund H. Blunt,
BY
ATTORNEY

Reissued Aug. 18, 1931

Re. 18,157

UNITED STATES PATENT OFFICE

EDMUND H. BLUNT, OF BROOKLYN, NEW YORK

LOCOMOTIVE FEED WATER HEATER AND PUMP

Original No. 1,551,727, dated September 1, 1925, Serial No. 448,778, filed March 1, 1921. Application for reissue filed August 23, 1926. Serial No. 131,134.

The invention relates to feed water heaters and more particularly to such as may be applied to locomotive boilers.

While the application of a feed water heater to locomotive boilers has not been general in any sense, its desirability in this connection is fully appreciated and it is recognized that great economy would result if a proper feed water heater could be designed for such use. Of the two recognized types, namely closed or pressure heaters and open or non-pressure heaters, the latter is by far the preferable in view of its smaller size, absence of serious temperature and boiler pressure stresses, the elimination of scale and other impurities and a direct saving of the water of condensation. However, such an open type heater requires in locomotive use, a cold water pump for spraying the condensing water and in overcoming back pressure. It necessitates, also, the use of hot water pumping apparatus for removing the heated water from the heater and for the purpose of delivering same under pressure to the boiler. While the theoretical advantage of an installation of this character may be readily determined, the trouble heretofore has always been to properly incorporate the principle. Attempts have been made, experimentally, with heater apparatus, but the same have resulted generally in failure, due to one cause or another. It has been found, for example, that an injector cannot be employed to operate with an open type of heater and that the substitution of a pump or pumps for the usual injector involves difficulties; and the successful solution of the problem depends to a great extent on the pumping portion of the combination.

It will be appreciated, also, that when the feed water heater apparatus is to be applied to the side of a locomotive boiler, which appears to be the only practicable place to install it, that there are limits imposed in connection with its installation which prohibit the heater from extending much above and below, for example, the running board of the locomotive.

Due to the vertical limits imposed by locomotive installation and the necessity of a good sized vapor or spray chamber at the upper end of heater chamber, the range of high water and lower water levels is extremely limited and the problem of regulation of the same is of very great importance, as the lack of a reliable and efficient regulation means a failure of the apparatus as a whole. It will be found, furthermore, that a predetermined ratio between the volume of injection and ejection water is required to maintain the water level in the heater within comparatively narrow limits; also, that means should be available to allow of a variation in this ratio during different seasons of the year, due to the different percentage of steam condensed; and that, moreover, proper facilities must be afforded to take care of any surplus water of condensation.

Having in consideration the various limitations and requirements aforesaid, my invention has for its object a simple and compact locomotive feed water heater and purifier which not only may conveniently and properly be located on the locomotive, but is capable of giving continuous and efficient operation under the various service conditions met with.

The nature of the invention will, however, best be understood when described in connection with the accompanying drawings, in which—

Fig. 1 is a fragmentary side elevation of a locomotive having a feed water heater attached to the side.

Fig. 2 is an end elevation of the parts shown in Fig. 1.

Similar characters of reference designate corresponding parts thruout the several views.

Figure 3:
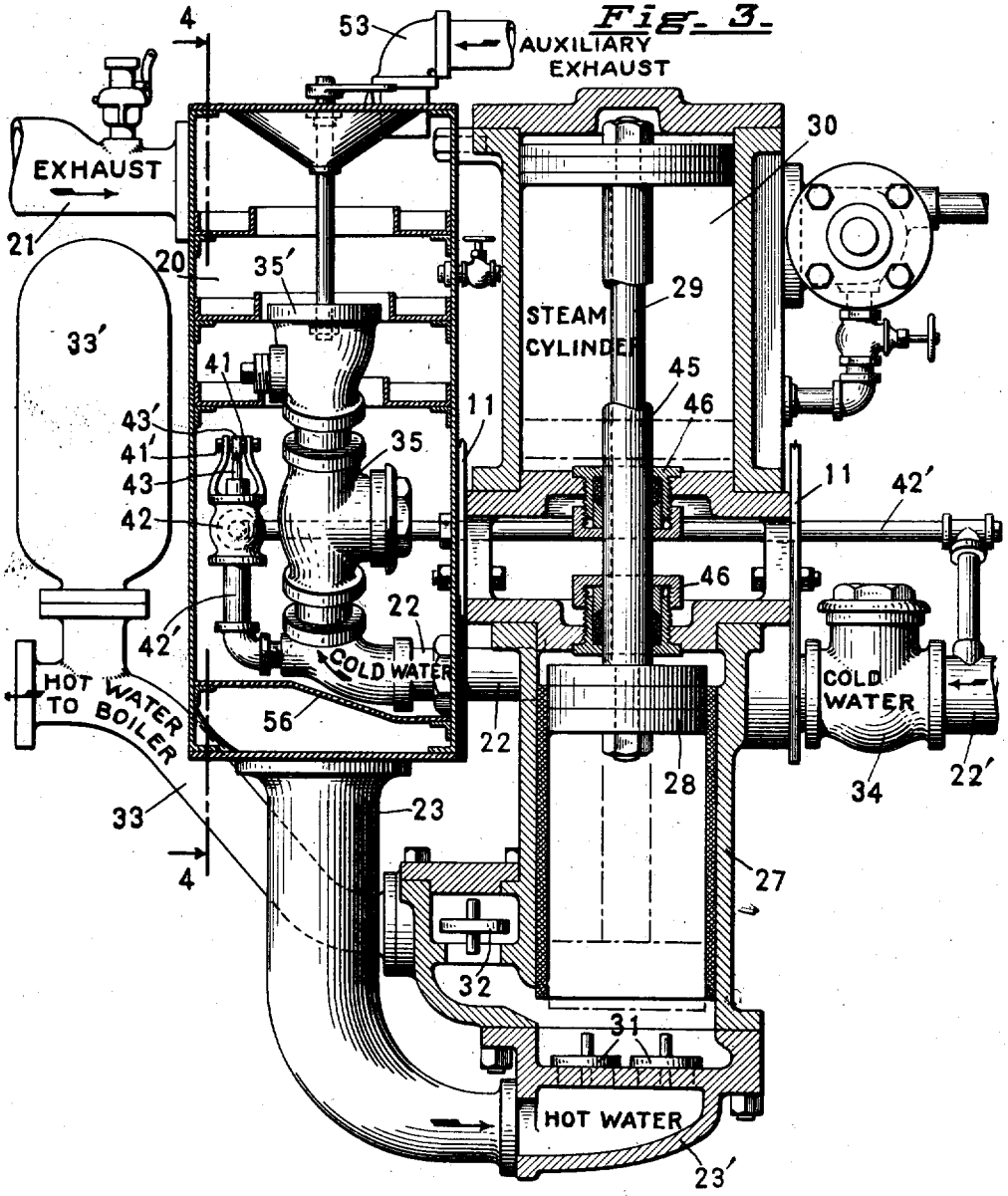
Fig. 3 is an enlarged sectional view taken substantially in the plane of the line 3—3 in Fig. 2.

Referring to the drawings, 10 designates a locomotive boiler to which may be attached, as by suitable plates and brackets 11, the feed water heater apparatus forming the subject matter of the present invention, 12 designates the running board of the locomotive which fixes, for example, the upper limit of the installation, the lower limit being fixed by the driving wheels 13 and associated mechanism.

The apparatus itself consists essentially of a main heater portion 20 connected as by means of the pipe 21 with, for example, the source of exhaust steam from the locomotive. A secondary heater portion 20′, may be attached to the rear of the main portion of the heater vessel 20 and may extend below the bottom of said main portion sufficiently to provide a settling chamber 57′ and allow room for a baffle plate such as 57, and a hot water outlet or passage to the pump suction that may be installed above the settling chamber so as not to directly disturb its contents. The entering steam may be distributed in any suitable manner therein to meet with the cold condensing water which is introduced as thru an inlet water supply pipe 22, cold water being preferably sprayed into the steam to be heated thereby and then collected in the bottom of the heater vessel.

The heater is provided with an outlet conduit 23 for the heated water, said conduit connecting with the pumping mechanism hereinafter described and which mechanism also controls the supply of the cold or injected water for condensing the steam in the heater 20.

This conduit 23 may be made detachable and also subdivided into a subcontent or valve casing 23′, thus providing a ready means for inspecting or repairing important parts of the pump mechanism, such as the removal of piston 28 through the bottom of pump barrel 27, the replacement of the piston rod sleeve 45, the reboring of the pump lining, etc., without further dismantling the remainder of the apparatus.

The heater is so located with reference to the hot water pump as to secure the maximum head of heated water for any given vertical height, and so as to insure, also, that gravity will assist the flow of heated water into the pump cylinder.

For effecting the delivery of cold injection water to the heater and removal of the heated ejection water therefrom, I employ a single acting cold water pump and a single acting hot water pump, said pumps being so combined into a unit that they utilize a single pump barrel 27 in which there is arranged to travel a piston 28 operated thru a piston rod 29. The latter is actuated from a suitable prime mover, for example, that indicated by the steam cylinder 30. The suction valves 31 of the hot water pump are preferably placed at the lowest practical level in order that the greatest effective head may be provided and the most direct pathway of the hot water to the pump afforded thereby and thus reducing the friction head.

I have shown the hot water suction valves, or at least the valve-seats, below the gasket or joint line of the pump barrel and the conduit 23 or 23′. Locating a plurality of these valves beneath and substantially within the downwardly projected area of the pump barrel will save considerable space that would otherwise be taken up were these valves outside of said area. The hot water pump is connected thru an outlet valve or valves 32 with a pipe 33 thru which is delivered the heated feedwater to the locomotive boiler. A suitable air chamber 33′ may be provided in the delivery pipe 33.

In connection with the upper portion or piston rod end of the barrel 27, a suction valve 34 for the cold inlet water is provided as well as an outlet valve 35 thru which and the pipe 22 the cold water is forced to the spray apparatus 35′ and the heater 20, for the purpose of being heated by the steam supplied thereto, as is well understood. The degree of pressure under which this injection water is to be supplied is determined by gravity, the possible back pressure of the main exhaust steam and the friction losses to be overcome; and, similarly, the pressure under which the hot ejection water is to be supplied is made to conform to the working boiler pressure.

The cold or injection water should approximate in quantity the hot or ejection water; and by the arrangement proposed, a definite ratio having once been established between same, no appreciable change in the ratio will result from variations in piston speed or length of stroke. It will be found, however, that the water of condensation will quickly flood the heater unless the amount of injection water is less than the hot water removed; and as such amount of water of condensation may reach 15% or more of the water to be fed to the boiler, the excess may be too large in amount to be safely or conveniently handled by an ordinary type of float controlled valve. In the construction set forth, a ready means is afforded for predetermining and also of changing, if required, the ratio between the injected and ejected water so that any excess due to condensation can be made so small as to be readily removed by a comparatively small float and small pipe, this excess being returned to a suitable source such as the cold water supply, or run off as waste. As one such means, I have shown a float 40 mounted for vertical movement in the heater 20 and adapted, as it reciprocates, to control thru a link 41 an outlet valve 42. The link 41 preferably rotating about or with a shaft or pin 41′, operates a cam member 43′ bearing on the outer end of a valve stem 43 of the outlet valve 42 to control said valve for the removal of the surplus water, which may be returned to or towards the source of supply or discharge as waste. Valve stem 43 may project through the valve body 42 by any recognized method, such as a stuffing box, that is tight enough to prevent any appreciable amount of cold water from escaping into the heater vessel, but free enough to allow proper play to the valve.

In the specific form shown, a by-pass connection 42′ connects the discharge or spray pipe 22 with the cold water inlet or suction pipe 22′.

When the water level in the heater is below a predetermined point, the cam 43′ acting on the stem 43 serves to wedge and hold the valve closed, but when the water level goes above the desired point, the cam permits the valve to open and part of the cold water is by-passed back to the suction 22′ or is led to any other desired point. The pump's pulsation tends to open the by-pass valve 42 at each cold water delivery stroke, and the varying positions of the periphery of cam 43′ at times restricts the amount that valve stem 43 can rise and so correspondingly restricts the valve movement. The valve can be made to return to its seat between strokes by means of its own weight, or by any other well known device.

To predetermine the ratio between the injected and ejected water, the diameter of the piston rod 29 may be so selected that its excess displacement will equal that percentage of condensed steam which experience and experiments will have shown not to be objectionable. It is understood, of course, that the stuffing boxes or glands, or both, for the piston rod will have to be accordingly altered to accommodate different sizes of piston rods. I prefer, however, to have the piston rod 29 of moderate diameter and to provide sleeves of various required diameters, for example, as the sleeve 45 shown, which sleeve is designed to be slipped over the piston rod, bearing against the bottom of steam piston and top of water piston, as shown, to conform to various service conditions. Corresponding stuffing boxes or glands will then be provided such as 46, the same being adapted to the varying size of sleeve that may be needed.

The construction aforesaid is particularly simple and efficient, two pump actions being secured within the limits and length of a single pump barrel and effective with a single piston and piston rod. This results in the elimination of two extra stuffing boxes, an extra pump cylinder and the corresponding clearances required by an alternate design of pump which would otherwise have added to the length of the apparatus. Such increase in the vertical or longitudinal dimension would, in many cases, prohibit the installation of a heater on locomotives where the limits are particularly close.

It will be appreciated that ordinarily during the periods of drifting of the locomotive, or periods during which the steam is substantially cut off and the locomotive is not functioning, the heater will be ineffectual to heat the feed water, in that there is substantially no exhaust steam being supplied to the heater. I have found it desirable, in order to obviate such a condition, to provide an auxiliary source of steam supply, preferably exhaust steam, which will be automatically available as soon as the main source fails. To this end, there may be utilized, for example, live steam or the exhaust from steam operated auxiliary apparatus, as the air pump 50, the said exhaust steam normally passing thru the exhaust pipe 51 in the usual manner to the stack (not shown). There is included, if found necessary, in said exhaust pipe a pressure regulating valve 52 which will serve to maintain a predetermined maximum pressure in the portion of the exhaust pipe between the valve and air pump. This pressure may be so chosen as to exceed the pressure in the heater 20 when steam from locomotive exhaust is no longer being supplied in sufficient amounts to said heater. A by-pass connection 53 is taken from the exhaust pipe 51 to the said heater between the regulating valve and auxiliary 50, and a check valve 54 interposed, so that as long as the pressure in the heater 20 exceeds that of the exhaust pipe 51 no appreciable amount of steam will flow in either direction thru the connection 53. However, when the main supply to the heater fails, the pressure of the auxiliary supply from the air pump or like apparatus will cause the valve 54 to open and steam to be furnished to the heater to continue the heating of the feed water, thus insuring continuous operation during the various service conditions prevalent in locomotive operation. This renders the operation automatic and prevents large amounts of cold water entering the boiler during periods of drifting; and the attention of the engineer is not then diverted to shutting down the feed water pump. Furthermore, the auxiliary apparatus is not exhausting at other times into the heater, a practice which is objectionable because of the excessive back pressure on auxiliaries that would be established thereby.

It is preferred, also, to include a check valve 55 in the main exhaust supply pipe 21 to insure the exhaust from the auxiliary apparatus entering the heater, when required and prevent possible reverse flow thru the pipe 21.

Figure 4:
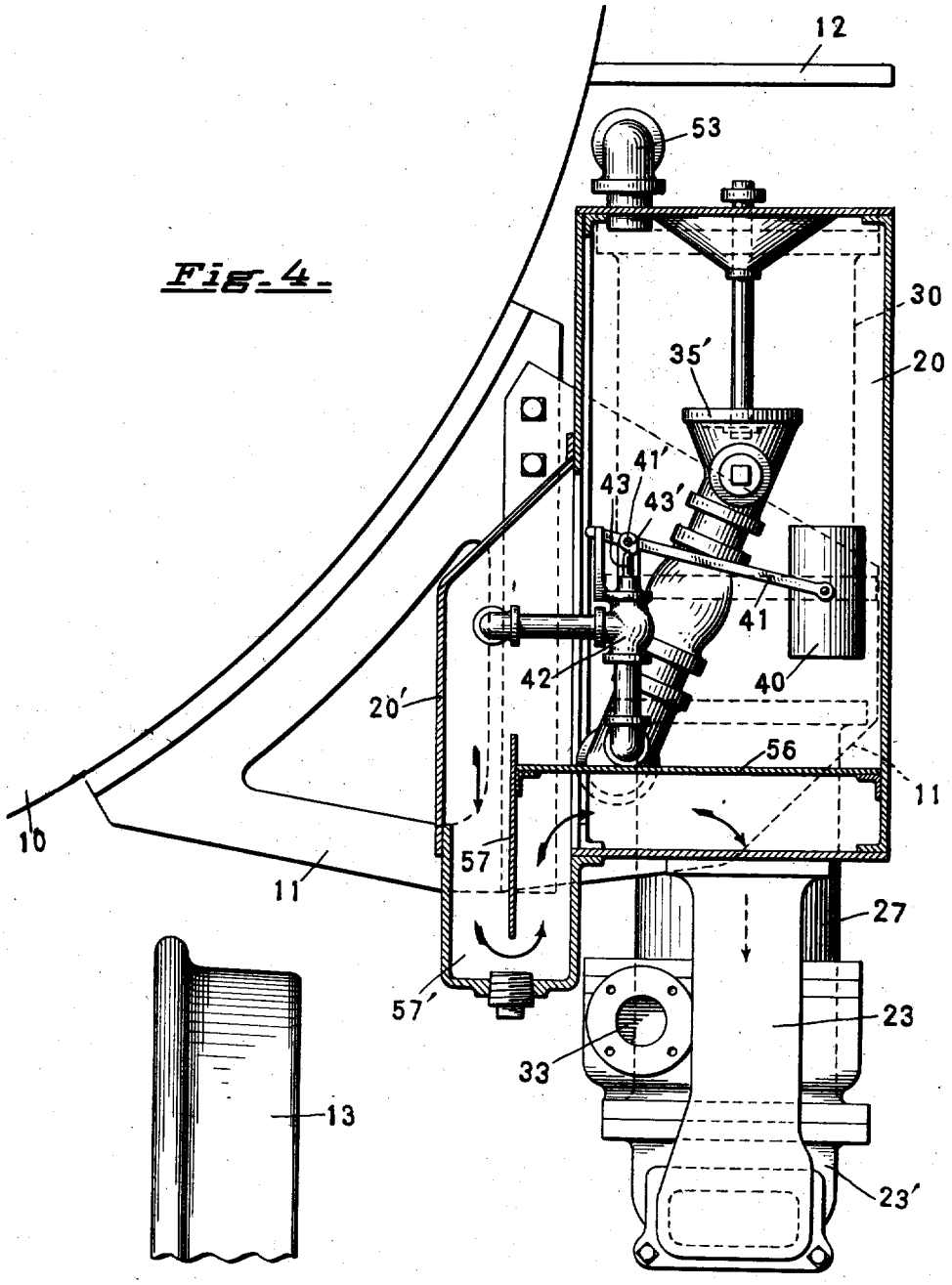
Fig. 4 is a sectional view taken substantially in the plane of the line 4—4 of Fig. 3.

To divert scale and impurities, a plate or baffle 56 protects the pump inlet 23, the flow of ejected water following the general directions of arrow, Fig. 4. By means of a vertical baffle 57, the suction is taken from the lowest part of the apparatus, thereby preventing floating material and accidental oil from entering the heated water supply pipe 23.

I claim:—

1. In a locomotive open type feed water heater, a heater vessel, a pump cylinder, a single piston reciprocating in said cylinder for forcing a certain volume of cold water into said heater vessel at each upward stroke of the piston and withdrawing a certain but larger volume of hot water from said vessel into the bottom of said cylinder at the same time, means for conducting steam to said heater vessel to be condensed by and mingled with the water therein, the volumetric displacement of the upper cold water end of the piston being less than the volumetric displacement of the lower hot water end of the piston by an amount determined by the cross-sectional area of the piston rod, a conduit for auxiliary steam supply to said heater vessel, and means for maintaining a pressure in said conduit sufficient to automatically admit steam to said heater vessel from the auxiliary steam supply conduit when the normal supply of steam to said heater vessel fails.

2. In a locomotive open type feed water heater, a heater vessel, a pump cylinder, a single piston reciprocating in said cylinder for forcing a certain volume of cold water into said heater vessel at each upward stroke of the piston and withdrawing a certain but larger volume of hot water from said vessel into the bottom of said cylinder at the same time, means for conducting steam to said heater vessel to be condensed by and mingled with the water therein, the volumetric displacement of the upper cold water end of the piston being less than the volumetric displacement of the lower hot water end of the piston by an amount determined by the cross-sectional area of the piston rod, a cold water by-pass connected between the upper cold water end of the cylinder and the heater vessel, a valve in said by-pass adapted to be opened by the pressure of water in said by-pass, and means operated by changes of water level in said heater vessel for limiting movement of said valve.

3. An open type feedwater heater comprising a heating vessel, means for normally admitting steam thereto, a pump cylinder and piston, one end of said cylinder being connected to a cold water supply and to said vessel for drawing cold water into said cylinder when the piston moves in one direction and forcing the cold water into said vessel when the piston moves in the opposite direction, an auxiliary conduit for automatically admitting steam to said vessel, a connection between said vessel and one end of said cylinder for drawing hot water into said cylinder when cold water is being forced into said vessel, an outlet from said cylinder for discharging hot water from said cylinder when cold water is being drawn in at the opposite end, and means for maintaining a pressure in said auxiliary conduit sufficient to admit steam to said heater vessel automatically from the auxiliary steam conduit when the normal supply of steam fails.

4. An open type feed water heater comprising a heater vessel, means for admitting steam thereto during normal operations, a hot water outlet from said vessel, a single pump cylinder and piston for forcing cold water into said vessel when the piston moves in one direction and drawing hot water from said vessel when the piston moves in the same direction, a conduit for auxiliary steam supply to said heater vessel, means for maintaining a pressure in said conduit sufficient to automatically admit steam to said heater vessel from the auxiliary steam supply when the normal supply of steam fails, a cold water by-pass connected between said pump cylinder and said heater vessel, a valve in said by-pass adapted to be opened by the pressure of water in said by-pass, and means operated by the increase in water level above a predetermined point for permitting said valve to be opened by the water pressure exerted by the pump.

5. In an open type feed water heater, a heating and mixing vessel, means for admitting exhaust steam to the upper part thereof, a valve controlled hot water outlet at the lower end thereof, a spray head for admitting cold water to said vessel at a point above the normal water level in the vessel, pumping means for forcing the same volume of cold water through said spray head into said vessel at each alternate stroke and withdrawing at the same time a greater volume of hot water from said vessel, the volume of hot water pumped from said heater vessel being the same at each pumping stroke for a given length of stroke, and means controlled by the pressure of exhaust steam in said vessel for admitting an auxiliary supply of exhaust steam to said vessel when the steam pressure in said vessel falls below a predetermined value.

6. In a locomotive feedwater heater, a heater vessel, a pump for forcing cold water into said vessel and for withdrawing hot water therefrom, means for conducting exhaust steam from the locomotive cylinders to said heater vessel for heating the water therein, means for conducting an auxiliary supply of steam to said vessel in case of failure of the supply of exhaust steam from the cylinders, and a regulating valve in said auxiliary steam conducting means for maintaining a pressure therein insufficient for causing a steam flow therein during normal flow of exhaust steam from the cylinders but sufficient to cause a flow into said vessel in case of failure of the normal flow of exhaust steam from the cylinders, and means for normally exhausting the auxiliary supply independently of said locomotive cylinder exhaust.

7. In a locomotive feedwater heater, a heater vessel, a pump for forcing cold water into said vessel and for withdrawing hot water therefrom, means for conducting exhaust steam from the locomotive cylinders to said heater vessel for heating the water therein, means for conducting an auxiliary supply of steam to said vessel in case of failure of the supply of exhaust steam from the cylinders, a regulating valve in said auxiliary steam conducting means for permitting a pressure therein sufficient to cause a flow of auxiliary steam into said vessel in case of failure of the normal steam supply from the cylinders, and means for normally exhausting the auxiliary supply independently of said locomotive cylinder exhaust.

8. In a locomotive feedwater heater, an open type heater vessel, pump means for forcing cold water into said vessel and for withdrawing a greater volume of hot water therefrom, means for normally conducting exhaust steam to the heater vessel for heating the water therein, means for conducting an auxiliary supply of steam to said vessel in case of failure of the normal supply of exhaust steam, a check valve on one of said steam conducting means opening toward said vessel for preventing a flow of steam from one of said conducting means to the other, means for normally permitting the exhaust of said auxiliary supply independently of the normal exhaust steam supply, and means for maintaining a pressure of auxiliary steam supply sufficient to open said check valve on a decrease of the normal supply of exhaust steam on a predetermined minimum.

9. In a feedwater heater, a heater vessel, means for conducting steam to said vessel, means for introducing cold water into said vessel, a constant water level valve, adapted to be opened by the pressure of water, a float in said vessel, and means actuated by said float and acting on said valve for holding the latter closed when the water level in said vessel is below a predetermined point, said means permitting said valve to be opened by the pressure of water to a limited amount proportionately to the rise of water level in the heater vessel above a predetermined point.

10. In a feedwater heater, a heater vessel, pumping means for forcing cold water into said vessel and drawing hot water from said vessel, means for conducting steam to said vessel, a by-pass for cold water from said pumping means, a poppet type valve in said by-pass adapted to be operated by the pressure of cold water from said pumping means, and a float operated means controlled by changes of the water level in said vessel for preventing the movement of said valve when the water level is below a certain height but permitting said valve to be opened by the water pressure when the water level rises above a predetermined height in said vessel.

11. In a feedwater heater, a heater vessel, means for introducing steam into said vessel, pump means for introducing cold water into said vessel and withdrawing hot water therefrom, a conduit connecting said heater vessel with the hot water pumping unit, said conduit including an inlet valve casing removably secured to said hot water pumping unit, and a hot water inlet valve in said casing and positioned below the lower end of said pumping unit.

12. In a locomotive open type feedwater heater, a heater vessel, means for conducting steam to said heater vessel, a single pump cylinder and single piston therein for forcing cold water into said vessel and withdrawing hot water therefrom, a piston rod for actuating said piston and located in the cold water end of said cylinder, a sleeve surrounding said rod and passing to the outside of said cylinder for reducing the volumetric displacement of the cold water end of said pump.

13. In a locomotive feedwater heater, a heater vessel, pump means for forcing cold water into said vessel and for withdrawing hot water therefrom, means for normally conducting exhaust steam to the heater vessel for heating the water therein, means for conducting an auxiliary supply of steam to said vessel in case of failure of the normal supply of exhaust steam, a check valve in each of said steam conducting means and opening toward said vessels for preventing a flow of steam from one of said conducting means to the other, and means for normally permitting the escape of the auxiliary supply of steam independently of the normal supply of exhaust steam, and means for maintaining pressure in the auxiliary supply of steam sufficient to open the check valve in said auxiliary supply of steam when the normal supply of steam fails.

14. In a locomotive feedwater heater, a heater vessel, pump means for forcing cold water into said vessel and for withdrawing hot water therefrom, means for normally conducting exhaust steam to the heater vessel for heating the water therein, means for conducting an auxiliary supply of steam to said vessel in case of failure of the normal supply of exhaust steam, a check valve in said auxiliary steam supply means and opening toward said vessel, and a regulating valve in said auxiliary steam supply means for maintaining a pressure of steam therein, and means for normally disposing of the auxiliary supply of steam independently of the main supply of exhaust steam.

15. In a locomotive feedwater heater, a heater vessel, pump means for forcing cold water into said vessel and for withdrawing hot water therefrom, means for normally conducting exhaust steam to the heater vessel for heating the water therein, means for conducting an auxiliary supply of steam to said vessel in case of failure of the normal supply of exhaust steam, a check valve in each of said steam conducting means and opening toward said vessel, and a regulating valve in said auxiliary steam conducting means for maintaining a steam pressure therein, and means for normally preventing the auxiliary supply of steam from interfering with the normal supply of exhaust steam.

16. In a locomotive open-type feed water heater, a heater vessel, a pump cylinder, a reciprocating piston therein for forcing the same volume of cold water into said vessel at each pumping stroke and withdrawing hot water therefrom, the volume of hot water withdrawn from said vessel at each suction stroke being substantially the same, means for conducting steam to said heater vessel to mingle with the water therein the volumetric displacement of the cold water pumping means being less than the volumetric displacement of the hot water pumping means so as to allow at least for a part of the condensate, means for augmenting the supply of steam to said vessel in case of substantial decrease of the normal supply of steam, and means for maintaining a substantially constant water level in said heater vessel.

17. A locomotive open type feed water heater comprising a heater vessel, a pump cylinder, a single piston reciprocating in said cylinder for forcing a certain amount of cold water into said heater vessel at each upward stroke of the piston and withdrawing a certain larger volume of hot water from said vessel into the bottom of said cylinder at each upward stroke of the piston, means for conducting exhaust steam to said heater vessel to be condensed by and mingle with the water therein, the volumetric displacement of the upper cold water end of the piston being less than the volumetric displacement of the lower hot water end of the piston by an amount determined by the cross-sectional area of the piston rod, a cold water return conduit having its inlet end connected between the cold water end of said cylinder and the point of discharge to said heater vessel, and a valve for controlling the passage of water through said conduit, said valve being raised by the pump pulsation.

18. In an open feed water heater, a heater vessel served by a hot water and a cold water pump contained in a single cylinder, a detachable hot water conduit between the heater vessel and the end of the pump that does not contain the piston rod, said conduit being capable of separation into two parts detachably secured to one another, one of the detachable parts containing the hot water suction valves.

19. In a feed water heater, a heater vessel, a hot water and cold water pump combined in a single cylinder which supplies cold water to the heater vessel and withdraws hot water from said vessel, said pump having a number of hot water suction valves located directly beneath the pump piston and a removable bonnet carrying said hot water suction valves.

20. In a feed water heater, a heater vessel divided into two principal parts, namely, a main body and an auxiliary body with a major opening communicating with the auxiliary body in the rear, the auxiliary body extending below the main body, said lower extension of the auxiliary body being adapted to communicate with the hot water suction of an adjacent feed pump.

21. In a feed water heater, a heating vessel, means for introducing steam into said vessel, means for introducing cold water into said vessel, a by-pass with an inlet connected to the cold water introducing means, a valve in said by-pass adapted at times to be operated by pressure in said introducing means, and a water level float controlled means for variably restricting the opening of said by-pass valve.

22. In a feed water heater, a heater vessel, steam supply means, a conduit for supplying auxiliary steam to the vessel, and means for maintaining a pressure in said conduit sufficient to automatically cause auxiliary steam to be admitted to said vessel from said conduit when the normal steam supply to the vessel fails, and an independent auxiliary exhaust open at other times to the atmosphere or stack.

23. In a feedwater heater, a heater vessel with steam introducing means, also means for supplying water to said vessel, and means for removing water from said vessel, water level operated means, and an excess water by-pass controlled by a one way vertically movable valve, said valve being governed in its action by said water level operated means.

24. In a feedwater heater, a heating vessel with means for conducting steam thereto, a pump cylinder with a single piston reciprocating therein for delivering a quantity of water to said vessel during one pumping stroke and withdrawing a larger quantity of water from the vessel during the same stroke, an excess water conduit having its inlet end located at a point between the pump end that delivers water to the vessel and the discharge valve to said vessel, a vertically movable valve for controlling the passage of water through said conduit, said valve being opened by pump pulsation, and means controlled by changes of water level in the heating vessel for controlling the opening and closing of said conduit valve.

EDMUND H. BLUNT.